United States Patent [19]
Watson

[11] Patent Number: 5,829,805
[45] Date of Patent: Nov. 3, 1998

[54] WELDED ON SERVICEABLE BUMPER

[75] Inventor: Richard Gregory Watson, Leslie, Mich.

[73] Assignee: General Motors Corporation, Detroit, Mich.

[21] Appl. No.: 789,251

[22] Filed: Jan. 28, 1997

[51] Int. Cl.⁶ .................................................. B60R 19/24
[52] U.S. Cl. ............................................................ 293/155
[58] Field of Search .................................. 293/120–122, 293/154, 155

[56] References Cited

U.S. PATENT DOCUMENTS

| | | | |
|---|---|---|---|
| 3,427,063 | 2/1969 | Taylor | 293/155 |
| 3,773,373 | 11/1973 | McLauchlan | 293/155 X |
| 4,783,104 | 11/1988 | Watanabe et al. | 293/154 X |
| 4,976,481 | 12/1990 | Yoshihira | 293/155 |
| 5,425,561 | 6/1995 | Morgan | 293/120 |
| 5,620,218 | 4/1997 | Saltzman et al. | 293/155 X |

FOREIGN PATENT DOCUMENTS 77367 3/1990 Japan ...................................... 293/155

*Primary Examiner*—Dennis H. Pedder
*Attorney, Agent, or Firm*—Charles E. Leahy

[57] ABSTRACT

A bumper subassembly includes first and second brackets which are removably attached to an impact beam by removable fasteners installed between the brackets and the beam. The brackets of the bumper subassembly are then subsequently welded to the frame rails so that the bumper subassembly becomes welded to the vehicle frame rails in the assembly plant but removal of the removable fasteners permits subsequent disassembly of the impact beam from the brackets to permit repair of the vehicle. The impact beam is preferably a closed tubular beam having a support wall, and first and second openings are provided in the support wall which receive reinforcing portions provided integrally on the brackets. Clearance holes are provided in the support wall to provide access to the bracket for making the spot weld between the bracket and the frame rail.

2 Claims, 3 Drawing Sheets

WELDED ON SERVICEABLE BUMPER

TECHNICAL FIELD

The invention relates to a motor vehicle motor system which is welded onto the vehicle frame but readily removable for vehicle repair by removal of fastening bolts.

BACKGROUND OF THE INVENTION

It is well known in motor vehicles to provide impact bumpers at the front and rear of the vehicle which extends transversely and are suitably attached to the laterally spaced apart longitudinally extending frame rails of the vehicle.

It is known to attach the bumper impact beam to the frame rails using removable fasteners such as bolts. A principal advantage of a bolted on bumper impact beam is that the bumper impact beam can be readily removed from the frame rails to facilitate repair of the vehicle.

It is also known to attach the bumper impact beam to the frame rails of the motor vehicle by welding the impact beam to the frame rails. This welded attachment is advantageous in the vehicle assembly plant because the bumper impact beam can be precisely located relative the frame rails via fixturing devices which maintain the precise location while the bumper impact beam is welded permanently in place. However, the welded on bumper impact beam is difficult to remove from the vehicle during repair of the vehicle.

SUMMARY OF THE INVENTION

The present invention relates to a bumper system and method which permits the bumper to be welded in place in the assembly plant and yet easily removed to permit repair of the vehicle.

According to the invention, a bumper subassembly includes first and second brackets which are removably attached to the impact beam by removable fasteners installed between the brackets and the beam. The brackets of the bumper subassembly are then subsequently welded to the frame rails so that the bumper subassembly becomes welded to the vehicle frame rails in the assembly plant but removal of the removable fasteners permits subsequent disassembly of the impact beam from the brackets to facilitate repairs. The bumper impact beam is preferably a closed tubular beam having a support wall, and first and second opening provided in the support wall which receive reinforcing portions provided integrally on the brackets. Clearance holes are provided in the support wall to provide access to the bracket for making the spot weld between the bracket and the frame rail.

DESCRIPTION OF THE PREFERRED EMBODIMENT

Figure 1:
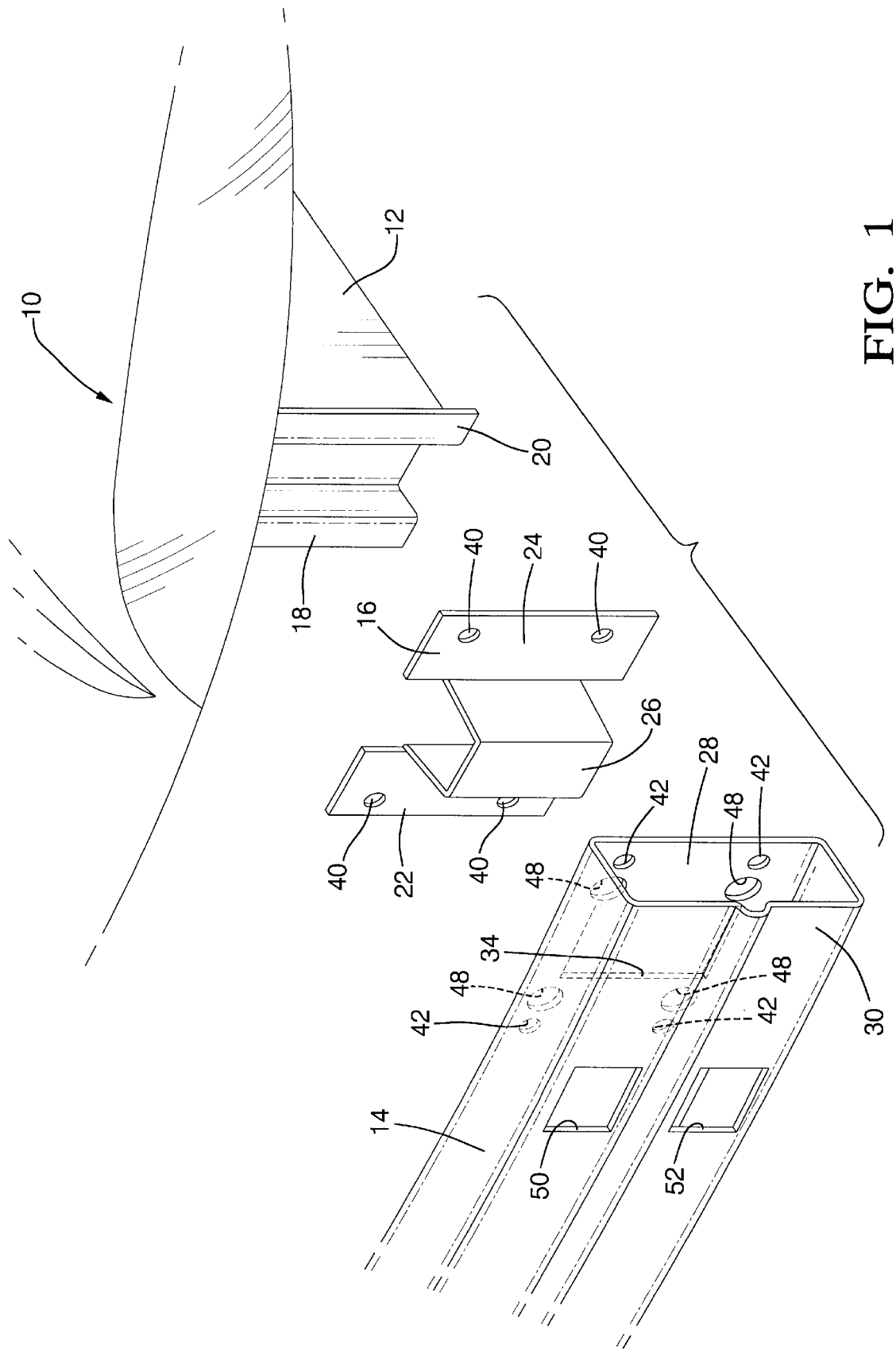
FIG. 1 is an exploded view of a bumper impact beam according to the invention.

Referring to FIG. 1, it is seen that a motor vehicle, generally indicated at 10, includes a left hand frame rail 12, a front bumper impact beam 14, and a bracket 16. The frame rail 12 is of welded construction and includes laterally extending attachment flanges 18 and 20.

The reinforcement bracket 16 is a stamped metal bracket which includes mounting flange portions 22 and 24 which extend laterally each side of a U-shaped reinforcing portion 26.

The bumper impact beam 14 is a tubular beam of generally rectangular cross section and includes a support wall 28 and an impact wall 30. The impact wall includes a stiffening protuberance 32. The support wall 28 has a rectangular opening 34.

Referring again to FIG. 1, it is to be understood that FIG. 1 shows only left hand frame rail 12 but that the vehicle body also includes a right hand frame rail which is spaced laterally of the frame rail 12. In addition, a second reinforcing bracket is provided and interposed between the second frame rail and the bumper impact beam 14.

Figure 2:
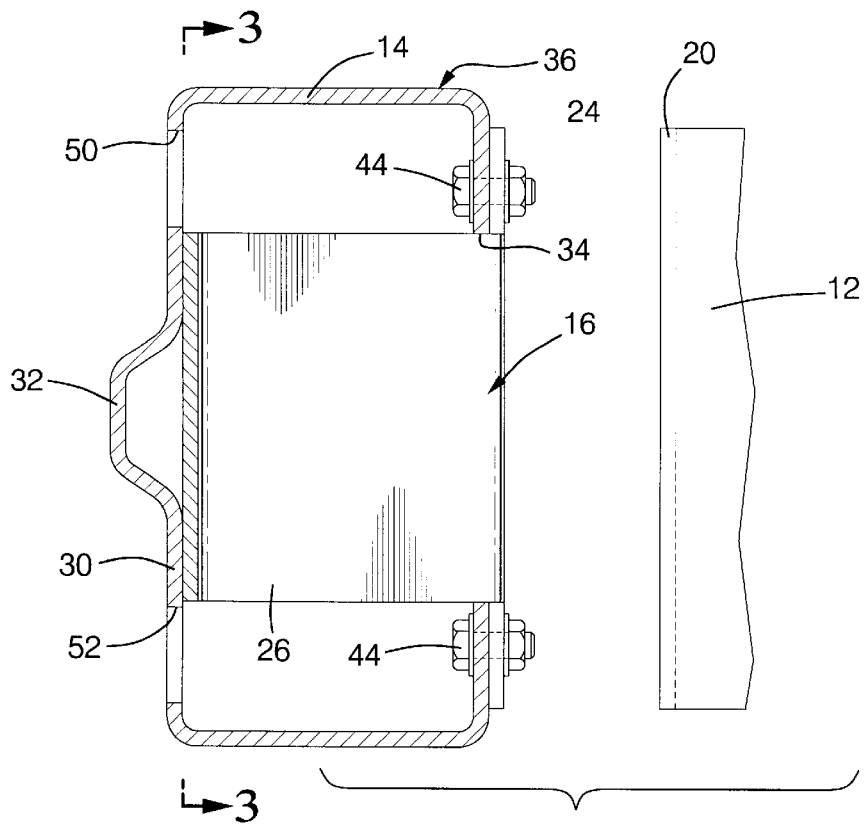
FIG. 2 shows the impact beam and reinforcing brackets assembled together to create a bumper assembly for subsequent welding to the vehicle frame rail.

Referring to FIG. 2, it is seen that the reinforcing bracket 16 and the impact beam 14 are assembled together to provide a bumper subassembly, generally indicated at 36. The U-shaped reinforcement portion 26 of bracket 16 is inserted through the opening 34 and engages with the impact wall 30 of the beam while the flanges 22 and 24 of the bracket abut against the support wall 28. As best seen in FIG. 1, the reinforcement bracket 16 is provided with a plurality of bolt holes 40 which align with mating bolt holes 42 provided in the impact beam 14. As shown in FIG. 2, a plurality of nut and bolt assemblies 44 are installed between the aligned holes 40 and 42 to attach the reinforcement 16 to the impact beam 12.

Figure 3:
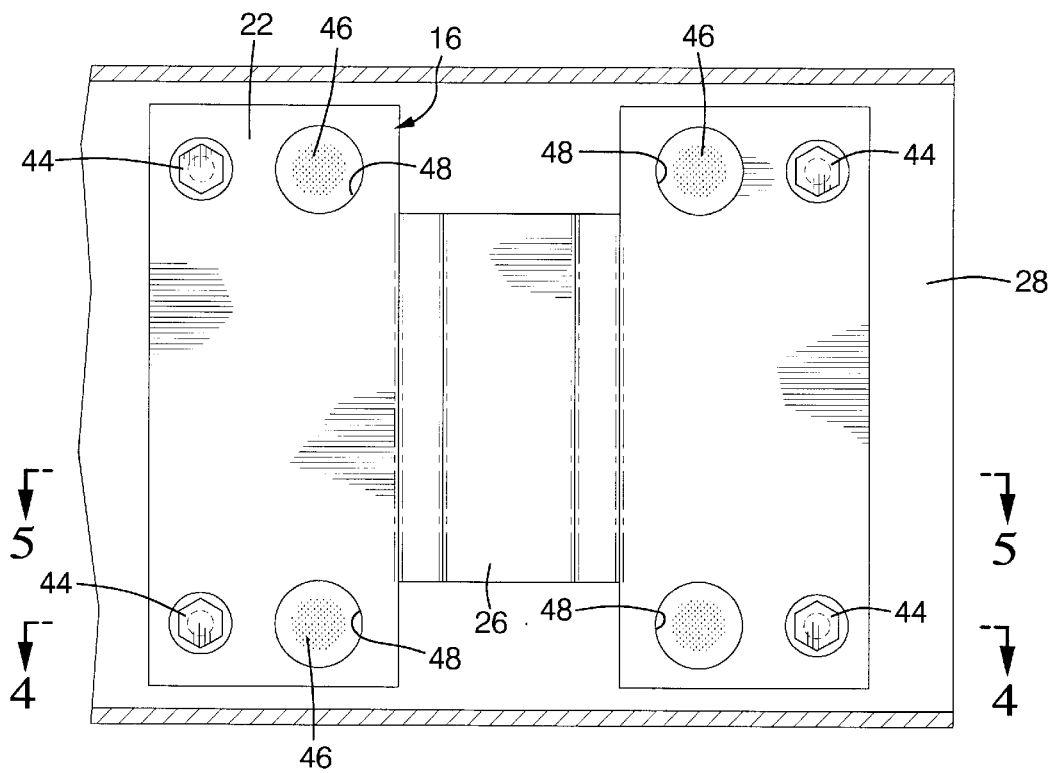
FIG. 3 is a section view taken in the direction of arrows 3—3 of FIG. 2.
Figure 4:
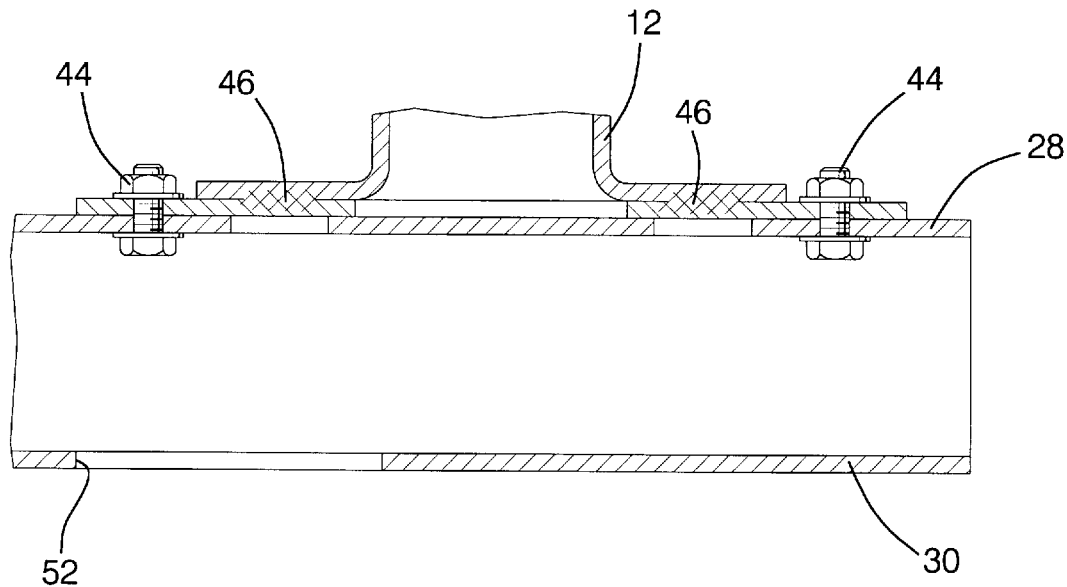
FIG. 4 is a section view taken in the direction of arrows 4—4 of FIG. 3.
Figure 5:
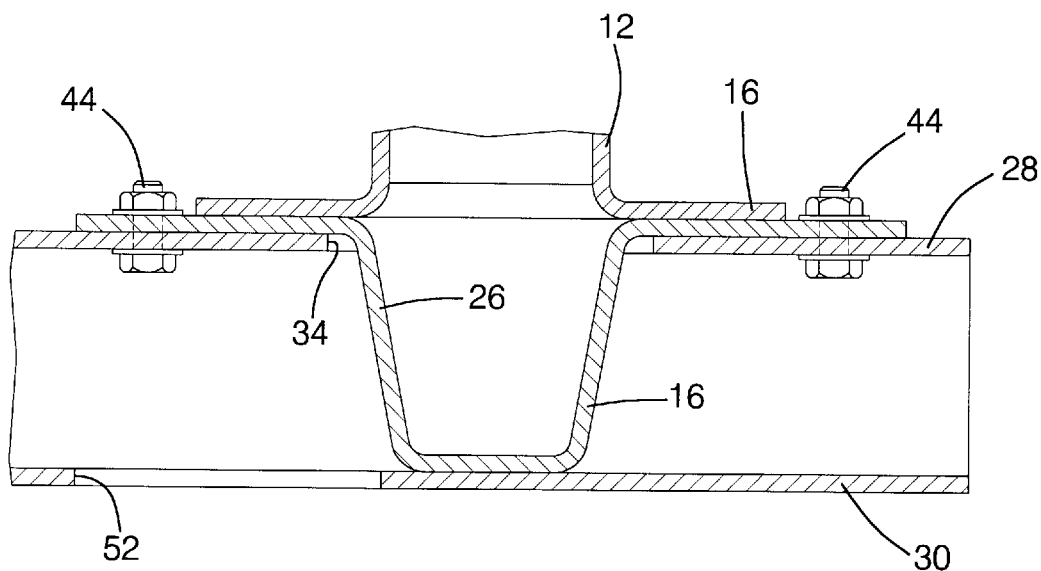
FIG. 5 is a section view taken in the direction of arrows 5—5 of FIG. 3.

As best seen in FIGS. 3, 4 and 5, the bumper subassembly 36 is welded to the vehicle frame rail 12 via resistance spot welds 46. In order to provide access to the flanges of the reinforcement bracket 16, a plurality of access holes 48 are provided in the support wall 28 of the impact beam 14. Furthermore, as best seen in FIGS. 1 and 4, an upper access hole 50 and a lower access hole 52 are provided in the impact wall 30 of the impact beam 14 to permit a weld tip to enter into the beam 14 and engage with the left hand mounting flange 22 of the mounting bracket 16. No such access openings are required for access to the right hand mounting flange 24 of the mounting bracket 16, as the right hand mounting flange 24 can be readily accessed though the open end of the tubular impact beam 14.

In the event the vehicle becomes damaged, or it is otherwise necessary to remove the impact beam 14 from the vehicle, it will be understood that such removal of the bumper is easily accomplished by disassembly of the nut and bolt assemblies 44. In particular, as seen in FIG. 5, the left hand bolt assemblies acting between the mounting flange 22 and the impact beam 14, can be accessed through the access opening 50 and 52. The right hand nut and bolt assemblies 44 acting between the impact beam 14 and the right hand mounting flange 24 of the mounting bracket 16 can be readily accessed through the open end of the impact beam 14. Upon such disassembly, the reinforcement bracket 16 remains welded to the frame rail 12.

Thus, it is seen that the invention provides a new and improved bumper system for a motor vehicle in which the bumper assembly is welded to the vehicle frame rails but can be readily removed from the vehicle by removal of the nut and bolt assemblies.

I claim:

1. In a motor vehicle bumper system of the type having an impact beam for attachment to the laterally spaced longitudinal extending first and second frame rails of the vehicle, the improvement comprising:

said impact beam being a closed tubular beam having a support wall closest the frame rails and an impact wall further from the frame rails and said impact beam having first and second openings provided in the support wall and registering respectively with the first and second frame rails;

first and second reinforcement brackets, each of the brackets having mounting flange portions adapted to overlie the support wall on opposite sides of the respective opening and a reinforcing portion thereof extending through the opening into proximity with the impact wall;

a plurality of removable fasteners acting between the flange portions of the brackets and the support wall of the impact beam to subassemble the brackets to the impact beam for subsequent assembly to the vehicle rails;

clearance holes provided in the support wall of the impact beam and registering with the flange portions of the brackets to enable access to the flange portions of the brackets from inside the tubular impact beam;

and spot welds permanently attaching the brackets of the frame rails so that the bumper subassembly is attached to the vehicle but removal of the removable fasteners permits subsequent disassembly of the impact beam from the brackets.

2. In a motor vehicle bumper system of the type having an impact beam for attachment to the laterally spaced longitudinal extending first and second frame rails of the vehicle, the improvement comprising:

said impact beam being a closed tubular beam having a support wall closest the frame rails and an impact wall further from the frame rails and said impact beam having first and second openings provided in the support wall and registering respectively with the first and second frame rails;

first and second reinforcement brackets, each of the brackets having mounting flange portions adapted to overlie the support wall on opposite sides of the respective opening and a reinforcing portion thereof extending through the opening into proximity with the impact wall;

a plurality of removable fasteners acting between the flange portions of the brackets and the support wall of the impact beam to subassemble the brackets to the impact beam for subsequent assembly to the vehicle rails;

and spot welds permanently attaching the brackets to the frame rails so that the bumper subassembly is attached to the vehicle but removal of the removable fasteners permits subsequent disassembly of the impact beam from the brackets.

* * * * *